(12) United States Patent
Gallman et al.

(10) Patent No.: US 8,746,622 B2
(45) Date of Patent: Jun. 10, 2014

(54) AIRCRAFT DE-ICING SYSTEM AND METHOD

(75) Inventors: John W. Gallman, Wichita, KS (US); Vicki S. Johnson, Bel Aire, KS (US); Derek William Rounds, Wichita, KS (US); Jim R. Hoppins, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 282 days.

(21) Appl. No.: 12/796,401

(22) Filed: Jun. 8, 2010

(65) Prior Publication Data

US 2011/0297789 A1    Dec. 8, 2011

(51) Int. Cl.
*B64D 15/12*    (2006.01)

(52) U.S. Cl.
USPC ..................................... 244/134 D

(58) Field of Classification Search
USPC .................. 244/134 A, 134 E, 134 R, 134 D
See application file for complete search history.

(56) References Cited

U.S. PATENT DOCUMENTS

| | | | | |
|---|---|---|---|---|
| 3,086,393 A | * | 4/1963 | Silverschotz | 73/170.26 |
| 6,283,411 B1 | * | 9/2001 | Giamati et al. | 244/134 A |
| 6,330,986 B1 | * | 12/2001 | Rutherford et al. | 244/134 E |
| 8,006,934 B2 | * | 8/2011 | Alexander et al. | 244/134 D |
| 2006/0237590 A1 | * | 10/2006 | Layland et al. | 244/134 R |

* cited by examiner

*Primary Examiner* — Valentina Xavier
(74) *Attorney, Agent, or Firm* — Lathrop & Gage LLP

(57) ABSTRACT

An aircraft de-icing system and method for removing the ice from the surface of an aircraft. The aircraft de-icing system reduces power requirements by allocating power from a single power source between the parting strip elements and the shed zone elements. The aircraft de-icing system may utilize a measurement of heat transfer to schedule the time necessary to shed ice from the surface of the aircraft. The de-icing system may also utilize a method for calculating the ice accumulation on the surface of the aircraft based on the outside air temperature.

6 Claims, 5 Drawing Sheets

AIRCRAFT DE-ICING SYSTEM AND METHOD

BACKGROUND OF THE INVENTION

1. Field of the Invention

The invention relates generally to aircraft. More specifically, the invention relates to the field of de-icing systems and methods for aircraft.

2. Description of the Related Art

Traditional electrical de-icing systems for aircraft employ parting strips and shed zones to prevent ice buildup on various elements of the aircraft during operation. The parting strips, on the leading edge of aircraft surfaces, and shed zones, on the upper surface of the aircraft, incorporate heating elements to heat the surface of the aircraft. This causes ice deposited on the surface to be de-bonded and be removed by aerodynamic forces. The use by the de-icing system of both parting strips and shed zones may lead to excessive power requirements to operate both types of elements concurrently. Such de-icing systems also utilize a number of sensors to determine the environmental conditions in which the aircraft is operating and the state of various elements of the de-icing system increasing the complexity of the de-icing system and its mean time to failure.

SUMMARY

The invention is defined by the claims below. An embodiment of the invention includes a de-icing system that shares a power source between the parting strip heating element and the shed zone heating elements to minimize the overall power requirements of the de-icing system while preventing ice buildup on the surface of the aircraft. Another embodiment of the de-icing system utilizes the outside air temperature to estimate the accumulation of ice between de-icing cycles to maximize the time between de-icing cycles. Another embodiment of the invention measures the heat transfer through the parting strip or the shed zone heating elements. This is used to determine the necessary time to shed ice from the shed zone minimizing the runback of liquid water to regions aft of the protected surfaces.

BRIEF DESCRIPTION OF THE DRAWINGS

Illustrative embodiments of the de-icing system are described in detail below with reference to the attached drawing figures, which are incorporated by reference herein.

DETAILED DESCRIPTION

Figure 1:
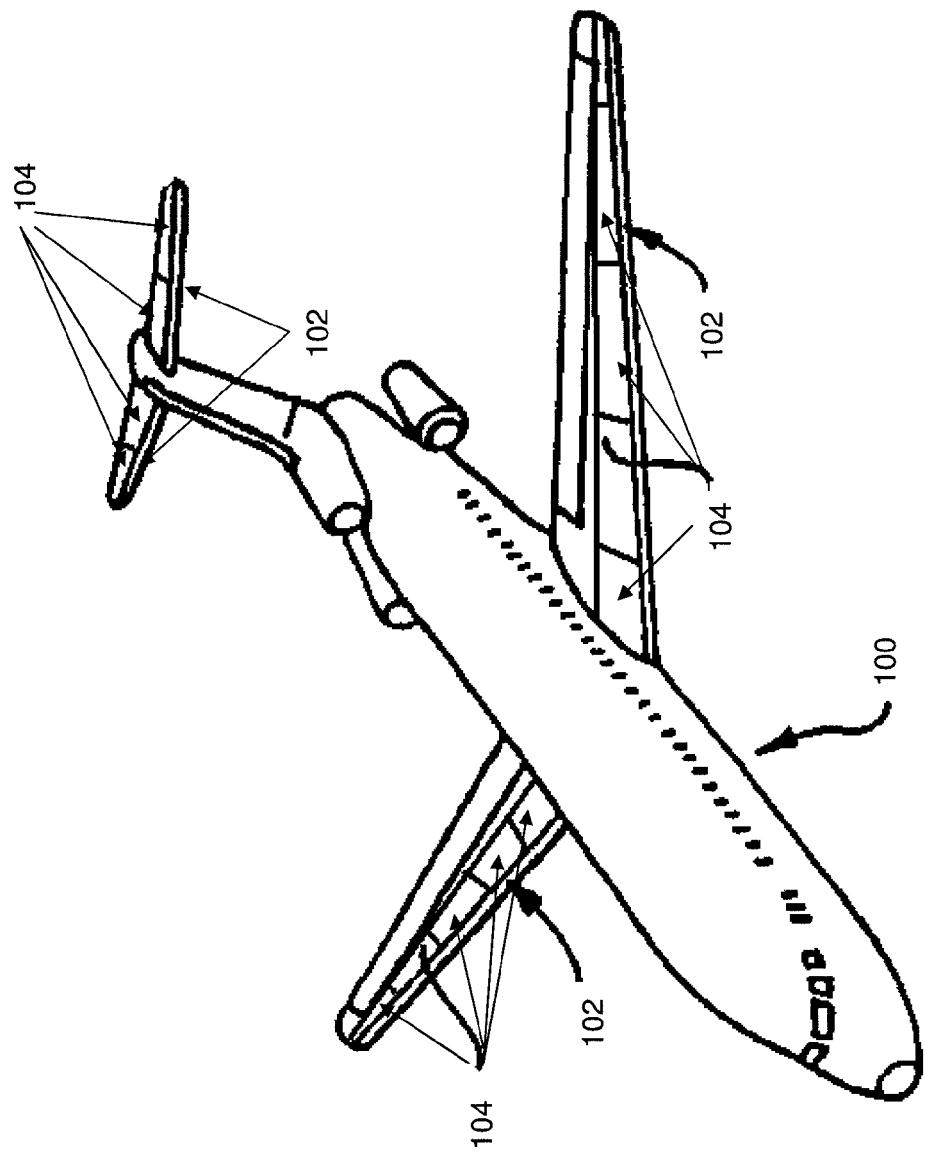
FIG. 1 is a perspective view of an aircraft incorporating an embodiment of the de-icing system.

Referring now to FIG. 1, an aircraft 100 is shown incorporating the de-icing system. Aircraft 100, as shown, is merely representative of the types of aircraft on which the de-icing system could be utilized, and is not a limitation of the de-icing system. The de-icing system, among other elements, incorporates electrothermal heating elements to heat the surface of the wings and other surfaces of aircraft 100, and thereby de-bond the ice on those surfaces. The heating elements include parting strip heating elements 102 and shed zone heating elements 104, both of which may be constructed from the same type of heating element material, but differ in configuration and use in the de-icing system, as discussed further with reference to FIG. 3 below.

The heating elements of the de-icing system may be installed on the interior or exterior of the skin of aircraft 100 or incorporated into the skin, therefore FIG. 1 shows the general areas of the aircraft 100 in which the heating elements 102 and 104 of the de-icing system are installed, not the specific location of installation.

The parting strip heating element 102 and shed zone heating element 104 are constructed of materials, and in a manner, that is commonly known in the art of de-icing systems. Heating elements 102 and 104 typically have a power density in the range of 10 to 40 watts per square inch.

Parting strip heating elements 102 are located spanwise along the leading edges of the wings and tail surfaces of aircraft 100, and may also extend along the leading edge of other surfaces of the aircraft. Depending on the shape and configuration of the wing and any pylons or protuberances from the wing, additional parting strips 102 may extend along the chord of the wing at various locations.

The upper surfaces of the wings and tail surfaces of aircraft 100 are divided up into a plurality of shed zones which are sized based on the characteristics of the shed zone heating elements 104 and the de-icing system. The shed zone heating elements 104 extend back from the parting strips 102 across the chord of the wings and tail surfaces of aircraft 100. The aft extent of the shed zones is determined by droplet impingement considerations. The shed zone heating elements 104 typically extend over a portion of the span of the wing or tail surface. The number and size of shed zones is a function of the power density of the shed zone heating elements 104, the available power for use by any one shed zone heating element 104, the maximum permitted cycle time for de-icing all necessary surfaces on aircraft 100 and droplet impingement limits. The available power for use by the shed zone heating elements 104 must be sufficient to shed ice on all shed zones in the required time during the maximum continuous icing conditions as defined by the FAA in 14 CFR 25, Appendix C.

The de-icing system prevents ice buildup by maintaining an ice free surface in the area of the parting strip 102, while ice is allowed to accumulate on the shed zones 104, which are then heated to cause the ice to rapidly shed from the aircraft surface with minimal melting, and the associated runback of liquid water that would otherwise occur. The de-icing system must be able to maintain the parting strip clear of ice during intermittent maximum icing conditions, as defined by the intermittent maximum envelops of 14 CFR 25, Appendix C, and must also be able to shed ice from all the shed zones on the wing and tail surfaces within a certain period of time. The de-icing system minimizes the amount of power required to meet the required de-icing parameters by allocating power as needed to the parting strips 102 and shed zones 104.

Figure 2:
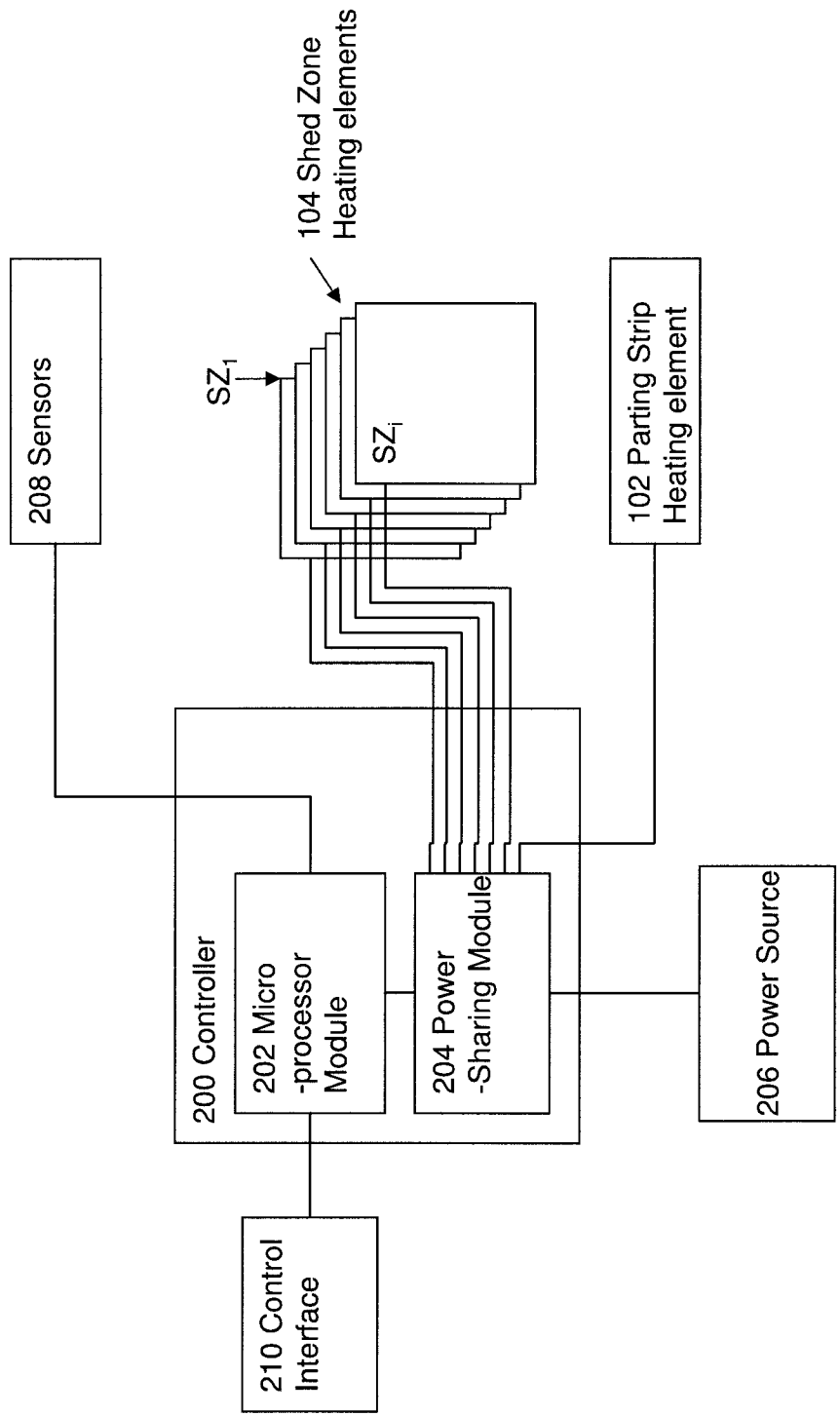
FIG. 2 is a schematic view of the elements of an embodiment of the de-icing system.

Referring now to FIG. 2, a schematic view of an embodiment of the de-icing system is shown. Controller 200 controls the on-going operation of the system and includes microprocessor module 202 and power sharing module 204. Microprocessor module 202 comprises a microprocessor of the type commonly used in aircraft control systems, including one or more microprocessor chips and the associated interface, memory and control circuitry necessary for the operation of the microprocessor. Microprocessor module 202 also stores and executes the firmware or software necessary to operate the deicing system.

Power-sharing module 204 provides functionality for switching electrical power from one or more power sources to a plurality of heating elements 102 and 104. The power-sharing module 204 is capable of individually allocating power from power source 206 to parting strips 102 and shed zones 104, at the direction of microprocessor module 202. Power-sharing module 204 can both switch the power from power source 206 individually to parting strips 102 and one of the shed zones 104, and may optionally be capable of sharing a portion of the power from power source 206 between parting strips 102 and one of the shed zones 104 to heat both concurrently.

In one embodiment of the de-icing system, power-sharing module 204 utilizes pulse width modulation to control the amount of energy delivered to heating elements 102 and 104 within a specified time period and to share power between the heating elements 102 and 104 by varying the percent of the total time period allocated to either heating element 102 or 104. In another embodiment of the de-icing system, the power-sharing module 204 may utilize a buck regulator circuit for each heating element to vary the power directed from power source 206 to that individual heating element by varying the operating voltage for each heating element 102 and 104. In preferred embodiments of the de-icing system, power source 206 provides a high voltage source of DC power (typically 270 volts).

Power source 206 must have the capacity to provide sufficient power to maintain the parting strip heating element at a desired temperature above freezing defined below as $T_{PS}$ and to de-ice all the shed zone heating elements 104 within the required time as defined below during a continuous maximum icing condition, as defined by government regulation. If an intermittent maximum icing condition occurs, the power source 206 must also have enough power capacity to maintain the parting strip heating elements at $T_{PS}$ although no shed zone heating need occur during the intermittent maximum icing condition.

Microprocessor module 202 utilizes various environmental data during operation of the de-icing system. Sensors 208 provide the necessary information, such as the outside air temperature, the temperature of the heating elements 102 and 104 and the temperature of the aircraft surface. Sensors 208 may be of well-known types used in aviation to measure outside air temperature (OAT), ice accumulation, and the surface temperature of the aircraft. In a preferred embodiment of the de-icing system, heating elements 102 and 104 are utilized as sensors 208. In this embodiment, heater element temperature is coupled with mathematical models of 1 dimensional heat transfer to estimate the outside air temperature, the surface skin temperature, and heat transfer at a steady-state condition.

First, one of the shed zones 104 may be utilized as a sensor of the outside air temperature (OAT). When the shed zone 104 is not in use as a heating element during de-icing the temperature of the shed zone 104 will stabilize in relation to the OAT. By measuring the resistance of the "cold-soaked" shed zone 104, the temperature of the shed zone heating element 104 is known and the OAT can be inferred from that temperature. Second, each of the parting strips 102 and shed zone heating elements 104 may provide, during their operation, a measure of the heat transfer q through the heating element 104, which may be used to schedule the time needed to shed the ice from the shed zone. In a preferred embodiment, the time scheduled for ice shedding is developed empirically in an icing tunnel, which enables a correlation of heater on-time with OAT and q for specified atmospheric conditions. As described in detail below, the combination of the OAT and the heat transfer through the heating elements 102 or 104 allow the de-icing system to control the shedding of ice from the shed zones. The heating element 102 and 104 may also provide a measurement of their own temperature based on their variable resistance when in operation.

The pilots of aircraft 100 interface with the de-icing system through control interface 210. The control interface 210 may optionally provide the pilots with a mechanism for turning the de-icing system on or off, and may also provide information to the pilots regarding the status and operation of the de-icing system. The control interface may include an on/off switch located in the cockpit, a status and warning light on the console, or an interface to the aircraft avionics system.

Figure 3:
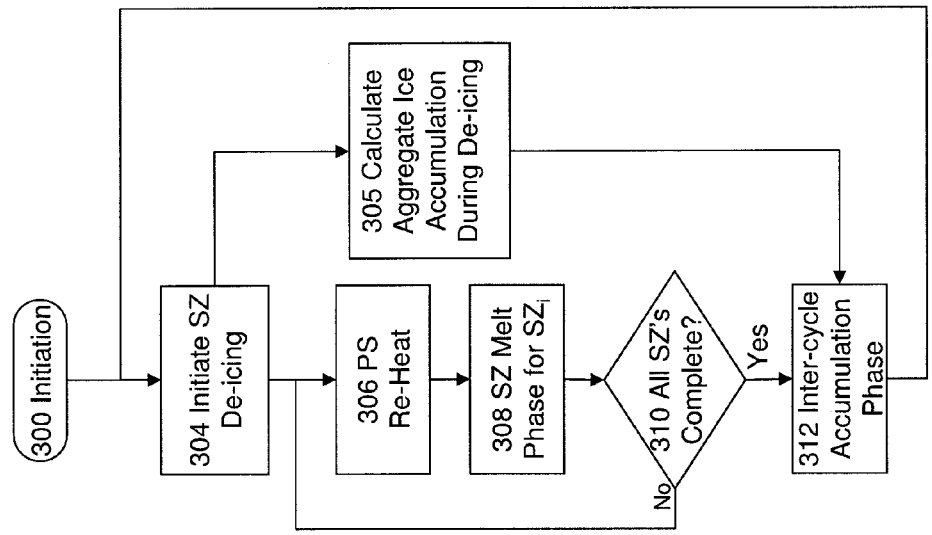
FIG. 3 is a flowchart of a method for using an embodiment of the de-icing system.

Referring now to FIG. 3, the de-icing process of the invention is initiated in step 300. In some embodiments, the initiation of the process is during the power-up of the aircraft in which the de-icing system is installed and the de-icing system may run continuously during operation of the aircraft, or it may be a manual process of initiation during operation of the aircraft whereby a pilot or co-pilot initiates the de-icing system through the control interface 210.

After the de-icing system initiation phase 300, the de-icing system initiates the shed zone de-icing in step 304. During step 304, the de-icing system begins tracking ice accumulation based on the environmental conditions. The estimation of ice accumulation continues throughout the shed zone de-icing, and in parallel with it, as step 305. The de-icing system causes ice to shed from each shed zone sequentially, thus while one shed zone is being de-iced by the system, ice is accumulating on the other shed zones. The ice on the surface of a shed zone 104 should be equal to the equivalent of a 2 minute accumulation at an OAT of 0 degrees Celsius at the maximum continuous icing conditions. As a result the de-icing system must track the icing that occurs during each cycle of its operation to correctly determine when to start the next cycle after the Inter-cycle Accumulation Phase 312, discussed below.

In one embodiment of the de-icing system, the de-icing system periodically calculates the incremental ice accumulation based on the OAT and the elapsed time of accumulation, and aggregates it into a running total of estimated ice accumulation. This allows the de-icing system to spend more time shedding ice at colder temperatures, because of the slower ice accumulation at these cold temperatures. The de-icing system calculates a maximum potential ice accumulation by calculating the ice accumulation that would occur at the actual OAT if the aircraft was flying through the continuous maximum conditions specified in 14 CFR 25 Appendix C FIG. 1 at the worst possible water drop size for the OAT. Other embodiments of the de-icing system could improve on this estimation of ice thickness with the use of ice detectors or an estimate of heat transfer through the parting strip or shed zone surfaces.

Figure 5:
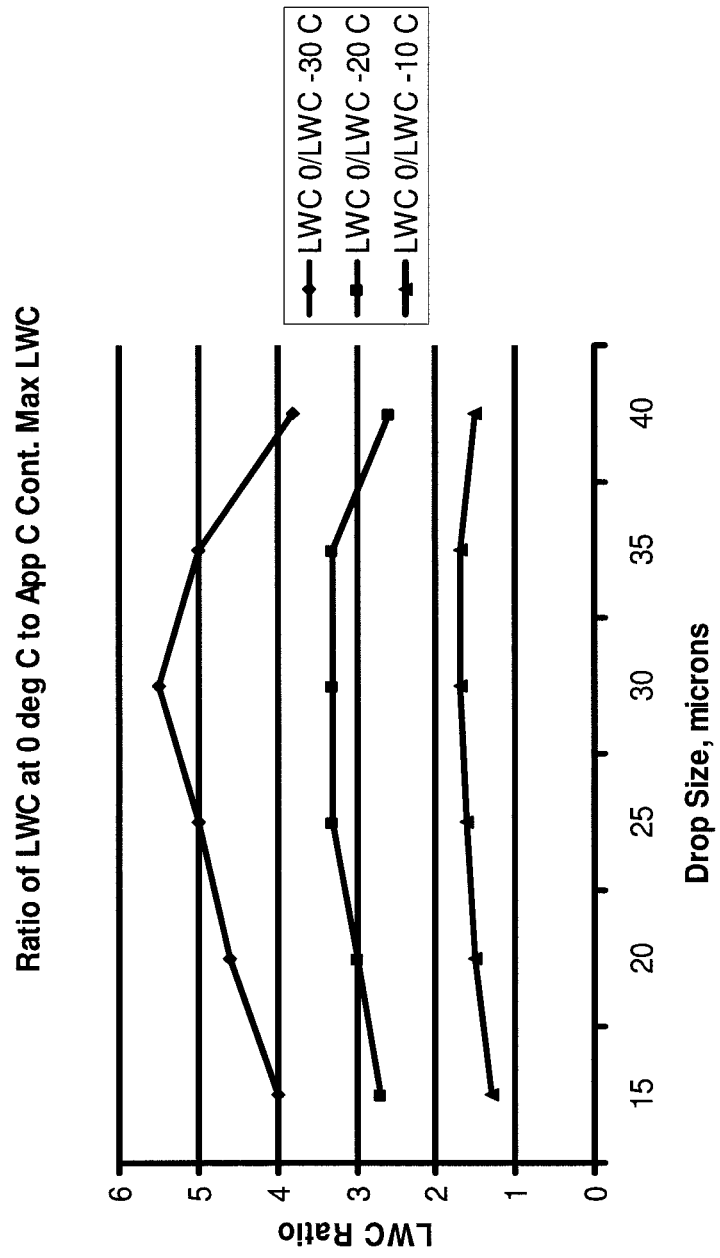
FIG. 5 is a chart of the ratio of continuous maximum liquid water content at various temperatures to the continuous maximum liquid water content at 0 degrees celsius.

The values for Liquid Water Content (LWC) at continuous maximum conditions at various temperatures, shown in 14 CFR 25 Appendix C, may be represented as a ratio of the LWC at 0 degrees C. to the estimated value, as shown in FIG. 5. The minimum ratios for each temperature, without regard to drop size, are given in Table 1 below, and can be considered a function of the OAT. Table 1 also shows the allowed time between de-icing cycles at each OAT. The minimum ratios provide an upper limit on the amount of ice that may accumulate at a given OAT, so estimating ice accumulation using these ratios will always yield an estimate of ice accumulation that is greater than or equal to actual ice accumulation.

TABLE 1

Minimum Ratio of LWC at OAT to t = 0 degrees C.

| OAT | Min. LWC Ratio (OAT) | 2 minute equivalent t (sec) |
|---|---|---|
| 0 | 1 | 120 |
| −10 | 1.3 | 156 |
| −20 | 2.6 | 312 |
| −30 | 3.8 | 456 |

Based on this formulation, the amount of ice accumulated at a given OAT is proportional to the amount of ice accumulated at 0 degrees Celsius for the same drop size and airspeed. By using the minimum ratio for any given temperature, the calculated aggregate ice accumulation will be the potential maximum ice accumulation, which may be more than the actual ice accumulation. The estimated ice accumulation can be calculated in terms of a time equivalent, where the elapsed time is weighted based on the OAT to an effective elapsed time equivalent to the 2 minute ice accumulation at 0 degrees Celsius.

Figure 4:
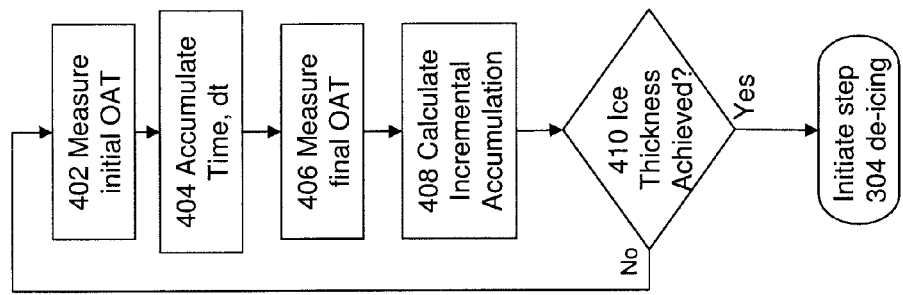
FIG. 4 is a flowchart of a method for calculating ice accumulation on the surface of an aircraft in an embodiment of the de-icing system.

Referring now to FIG. 4, the process of estimating the ice accumulation used in one embodiment of the invention is described. Other embodiments of the de-icing system may utilize other methods of measuring or calculating the ice accumulation. In step 402, the de-icing system measures the initial OAT, $OAT_0$. The OAT is measured by the de-icing system using sensors 208, which may include the use of "cold-soaked" (at ambient temperature) shed zone heating elements as temperature sensors. The de-icing system then waits a specified period of time, $dt_0$, in step 404, and then repeats the measurement of OAT for $OAT_1$. The average $OAT_{AVG}=(OAT_0\ OAT_1)/2$ is used to select the applicable minimum LWC ratio for the time period $dt_0$. Using the minimum LWC ratio removes the need to consider the drop size, because it assumes the worst possible drop size. The de-icing system then calculates the effective time of ice accumulation if the environmental conditions had been 0 degrees Celsius at the maximum continuous icing conditions. Since the system must wait for an aggregate equivalent of 2 minutes at an OAT of 0 degrees celsius, the time dt is weighted based on $OAT_{AVG}$ during the time period, as follows $$dt=dt_0/\text{Min LWC Ratio}(OAT_{AVG})$$

For an elapsed time $dt_0$ of 10 seconds at an OAT of −10 degrees celsius, the effective dt=10/1.3=7.7 seconds. Thus, although 10 actual seconds have passed, only 7.7 seconds are counted toward the 120 second time limit when a new de-icing cycle will begin. The de-icing system then adds the effective dt (7.7 seconds in this example) to the previously accumulated time for an aggregate effective ice accumulation time at a OAT of 0 degrees Celsius. If the aggregate effective ice accumulation time equals or exceeds 2 minutes then the de-icing system will initiate another cycle of shed zone de-icing in step 410. Since the cycle time to de-ice the shed zones may be less than 2 minutes, the restarting of the cycle will not occur until step 312, where the ice accumulation calculation continues after the completion of one cycle of the shed zone de-icing process.

Referring again to FIG. 3, while tracking the calculated ice accumulation in step 305, the de-icing system then cycles through the shed zones 104, individually heating each shed zone 104 to cause the ice to shed, as described below in regard to steps 306 and 308.

After the shedding of ice from all shed zones 104, determined at step 310, the de-icing system will wait in step 312 to initiate a new cycle of shed zone heating until the ice accumulation has reached an optimal thickness, based on OAT and elapsed time. Steps 306 through 312 are described more fully below. The de-icing system must be able to complete the process of shedding ice from all shed zones 104 in a specified period of time during the continuous maximum icing conditions specified by federal regulations. Additionally, ice sheds more cleanly and with less run-back of water when the ice is at least a minimum thickness.

The de-icing system uses a two step process to shed the ice from each shed zone 104. First the de-icing system ensures that the PS surface temperature is at the target $T_{PS}$ using feedback control. This phase is called the PS Re-Heat Phase 306 since the PS surface temperature may have dropped below the target during ice shedding from the previous zone. During step 306 the parting strip heating element 102 is controlled by the controller 200 to temperature $T_{PS}$. Residual power, if any, not necessary to heat the parting strip may optionally be directed to heat the shed zone during step 306. Second, feedback control priority is transferred to the active shed zone in the SZ Melt Phase 308 to shed ice. All other shed zone heating elements 104, except the active shed zone 104, receive no power from the de-icing system and cool to the ambient temperature.

In one embodiment of the de-icing system, heat transfer measurements associated with steady-state conditions at the parting strip or the active shed zone are used, along with the OAT, to schedule the time necessary to remove ice from the active shed zone during SZ Melt Phase 308. Although the parting strip heating element temperature is not under feedback control during SZ Melt Phase 308, a minimum amount of power is directed to the parting strip heating element 102 during this phase. This serves to arrest the rate at which the parting strip surface cools such that the surface is always kept above 0 degrees Celsius.

During SZ Melt Phase 308 controller 200 continues to share power between parting strip 102 and the active shed zone 104, however in phase 308 the controller directs enough power to shed zone 104 to increase its temperature to $T_{SZ}$, a temperature greater than 0 degrees Celsius, while allowing the parting strip 102 to receive a small, but specified amount of residual power. SZ Melt Phase 308 lasts for a short duration, denoted $t_{melt}$, less than 10 seconds and preferably less than 4 seconds, and is not long enough to allow ice to accumulate on the parting strip 102 because of the residual power directed to the parting strip 102 to reduce the cooling rate during Phase 308. Thus parting strip 102 remains ice free throughout the operation of the de-icing system since enough power is directed to it to keep it at a temperature above freezing for the entire operation of the system. As more power is directed to shed zone 104 in phase 308, the temperature of the shed zone 104 increases rapidly causing a thin layer of ice to de-bond at the surface of the aircraft 100. Once the layer of water between the aircraft 100 and the ice layer becomes sufficiently thick, the dynamic pressures on the ice overcome the surface tension of the water layer and the ice sheds from shed zone 104.

The duration of $t_{melt}$ may be fixed at a constant by the de-icing system, or scheduled based on the measured environmental conditions. It is preferable to minimize the duration of $t_{melt}$ as much as possible, since additional heating of the shed zone 104 after the ice has shed will lead to "runback" of liquid water on the surface of the aircraft, causing icing behind the trailing edge of shed zone 104. In one embodiment of the de-icing system, the length of Phase 308, $t_{melt}$ is determined by the heat transfer through the parting strip 102, heat transfer through the active shed zone heating element 104 and the outside air temperature.

Referring again to FIG. 3, after the accumulated ice sheds from the active shed zone 104, the system determines in step 310 if additional shed zones 104 remain to be de-iced in the current de-icing cycle. If so, the de-icing system then transitions into Phase 306 for the next shed zone 104, diverting power from the previously active shed zone 104 to parting strip 102 and then a new active shed zone 104, in the same manner as described above.

Once ice has been shed from all shed zones 104 in a cycle of the de-icing system, the system enters Inter-cycle Ice Accumulation Phase 312. While the de-icing system cycles through each shed zone, it also concurrently tracks the ice accumulation on the aircraft as described above in regard to step 305. The next de-icing cycle is initiated after ice accumulation has continued for the equivalent of 2 minutes at an OAT of 0 degrees Celsius. In one embodiment of the de-icing system, step 312 uses the same procedure set forth in FIG. 4 and the description thereof above to estimate the ice accumulation based on the OAT and the elapsed time.

Figure 6:
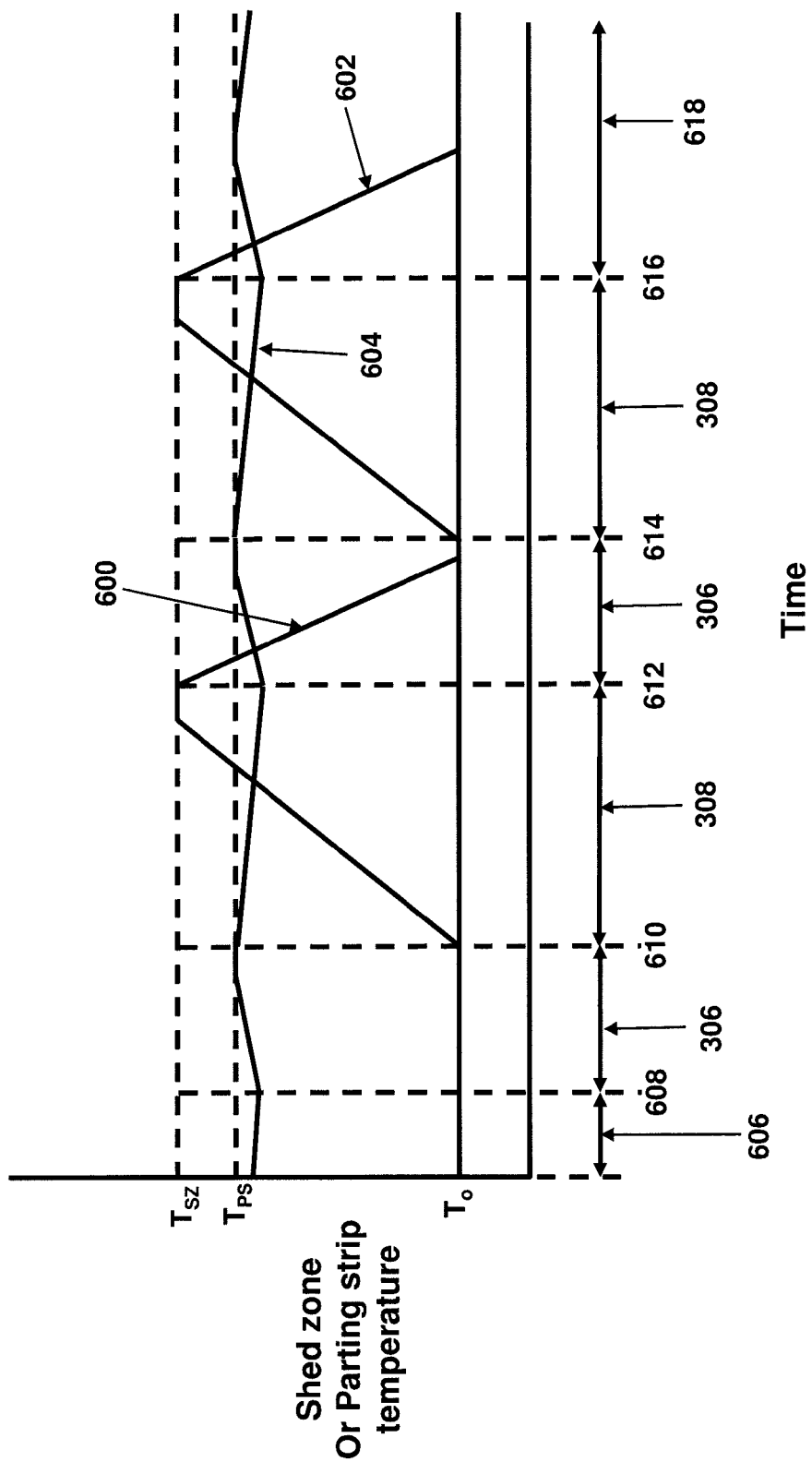
FIG. 6 is a graph of the temperature of exemplary shed zones and the parting strip during the operation of an embodiment of the de-icing system.

Referring now to FIG. 6, the temperature profile of two of the shed zones 600 and 602 and the parting strip 604 is shown during operation of the de-icing system. During time period 606, the de-icing system may have been in the Initiate SZ De-Icing Phase 304 or in SZ Melt Phase 308 for a different shed zone 104. The temperatures of other elements of the de-icing system are not shown here for purposes of clarity. In FIG. 6, $T_{PS}$ and $T_{SZ}$ are shown as different temperatures, however in various embodiments of the system, they may be the same or either one may be greater than the other as appropriate.

At time 608, the de-icing system enters PS Re-Heat Phase 306 for shed zone 600. During this phase 306, any residual power not needed to heat the parting strip may optionally be directed to the shed zone to begin warming it. In the embodiment shown in the figures, no residual power is shared with the shed zone and so shed zone temperatures remain stable at $T_0$ during step 306. Once the parting strip reaches its target temperature $T_{PS}$, slightly prior to time 610, microprocessor 202 directs power-sharing module 204 to transfer the power from the parting strip to shed zone 600 and the shed zone temperature begins to rise at time 610. The increase in the temperature of shed zone 600 during the SZ Melt Phase 308 need not be linear, as shown in FIG. 6. However, at the maximum continuous conditions required for the de-icing system, the power from power source 206 is sufficient to insure that shed zone 600 will reach $T_{SZ}$ within a finite amount of time. During Phase 308 the controller prioritizes heating the shed zone 600 to a set temperature, $T_{SZ}$, sufficient to cause the ice on the surface of the aircraft to shed, and allows the temperature of the parting strip 102 to fluctuate depending on the amount of extra power left to heat it. As the ice on the surface of shed zone 600 melts, a layer of water is formed between the surface of the aircraft 100 and the remaining ice. Once the layer of water becomes thick enough the ice sheds from the shed zone 600 at time 612. Shed zone 600 may reach $T_{SZ}$ slightly before time 612. After the ice sheds from shed zone 600 the surface temperature may rise slightly above or stay at target temperature $T_{SZ}$ until the scheduled melt time is complete.

The time required to melt sufficient ice from the surface of the aircraft for aerodynamic forces to remove the remaining ice from the surface of the aircraft may be determined by measuring the outside air temperature (OAT), measuring the temperature of the heating element, measuring the power required to maintain that temperature in the heating element, estimating the heat transfer (q) through the surface of the aircraft adjacent to the heating element using a one-dimensional steady-state heat relationship, retrieving the melt time from a schedule correlating OAT and q to the required melt time. The schedule correlating OAT and q to required melt time may be populated with data based on empirical testing performed in an icing tunnel.

Once shed zone 600 sheds the ice from its surface, shown at time 612, the de-icing system determines if any shed zones 104 remain to be heated in the current cycle. In the case shown in FIG. 6, shed zone 602 is the next shed zone to be heated, and the de-icing system enters the PS Re-Heat Phase 306 for this zone. The temperature of the parting strip 102 is stabilized at the appropriate temperature $T_{PS}$ and the shed zone 602 transitions to the SZ Melt Phase 308 at time 614, and sheds ice in the same manner as shed zone 600 at time 616.

During time 618, depending on the location of the active shed zone during the cycle, the de-icing system may heat additional shed zones 104 or enter the inter-cycle ice accumulation phase 312 described above.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

We claim:

1. A method for de-icing a surface of an aircraft having at least one parting strip heating element in thermal communication with the surface of the aircraft, a plurality of shed zone heating elements in thermal communication with the surface of the aircraft, a power source for heating the at least one parting strip heating element and the plurality of shed zone heating elements, and a controller for directing power from the power source to the at least one parting strip and the plurality of shed zone hating elements, comprising the steps of:

directing a first amount of power from the power source to each of the at least one parting strip heating element sufficient to heat a first portion of the aircraft surface adjacent to the parting strip heating element to a first target temperature until such time as said first portion of the aircraft surface reaches the first target temperature, and concurrently directing any residual power, if any, from the power source to one of the plurality of shed zone heating elements; and reducing the amount of power directed to the at least one parting strip heating element to a second amount of power less than the first amount of power;

directing an amount of the power from the power source to said one of the plurality of shed zone heating elements sufficient to bring said shed zone heating element to a second target temperature for a scheduled period of time;

increasing the amount of power directed to the at least one parting strip heating element to the first amount of power.

2. The method of claim 1 further comprising the step of:
repeating the method for each of the plurality of shed zone heating elements.

3. The method of claim 2 further comprising the step of:
directing the first amount of the power from the power source to the at least one parting strip heating element sufficient to heat said first portion of the aircraft surface to the first target temperature for a period of time to allow ice accumulation on the plurality of shed zone heating elements.

4. The method of claim 3 wherein the period of time to allow ice accumulation is scheduled based on the maximum potential accumulation of ice at an average air temperature measured outside the aircraft.

5. The method of claim 3 wherein the period of time to allow ice accumulation is calculated based on measurements of the air temperature outside the aircraft and the heat transfer through the at least one parting strip heating element.

6. The method of claim 5 wherein the period of time to allow ice accumulation is calculated by the steps of:
measuring the outside air temperature;
measuring the temperature of a heating element used to maintain the surface of the aircraft at a target temperature;
measuring the power required to maintain the heating element at a target temperature;
estimating the heat transfer through the surface using a one-dimensional steady-state heat relationship; and
acquiring the time required to melt a thin layer of ice from a schedule that correlates heating time to a combination of outside air temperature and heat transfer.

* * * * *

UNITED STATES PATENT AND TRADEMARK OFFICE
CERTIFICATE OF CORRECTION

| | | |
|---|---|---|
| PATENT NO. | : 8,746,622 B2 | Page 1 of 1 |
| APPLICATION NO. | : 12/796401 | |
| DATED | : June 10, 2014 | |
| INVENTOR(S) | : John W. Gallman et al. | |

It is certified that error appears in the above-identified patent and that said Letters Patent is hereby corrected as shown below:

In the Claims
Column 8, Line 49, "zone hating" should read --zone heating--.

Signed and Sealed this
Twenty-fourth Day of February, 2015

Michelle K. Lee
*Deputy Director of the United States Patent and Trademark Office*